United States Patent
Platel et al.

(10) Patent No.: US 10,501,371 B2
(45) Date of Patent: Dec. 10, 2019

(54) COPOLYMER AS A WATER-REDUCING AGENT IN A HYDRAULIC COMPOSITION AND USE OF COPOLYMERS FOR IMPROVING THE EARLY MECHANICAL STRENGTH OF A HYDRAULIC COMPOSITION

(71) Applicant: COATEX, Genay (FR)

(72) Inventors: David Platel, Rubelles (FR); Benoit Magny, Cailloux sur Fontaine (FR); Jean-Marc Suau, Lucenay (FR); Clementine Champagne, Caluire-et-Cuire (FR)

(73) Assignee: COATEX, Genay (FR)

( * ) Notice: Subject to any disclaimer, the term of this patent is extended or adjusted under 35 U.S.C. 154(b) by 103 days.

(21) Appl. No.: 15/705,324

(22) Filed: Sep. 15, 2017

(65) Prior Publication Data
US 2018/0002231 A1  Jan. 4, 2018

Related U.S. Application Data

(63) Continuation-in-part of application No. PCT/FR2016/050568, filed on Mar. 15, 2016, and a continuation-in-part of application No. PCT/FR2016/050571, filed on Mar. 15, 2016.

(30) Foreign Application Priority Data

Mar. 16, 2015 (FR) ..................................... 15 52126
Mar. 16, 2015 (FR) ..................................... 15 52129

(51) Int. Cl.
*C04B 24/26* (2006.01)
*C08F 220/06* (2006.01)
*C04B 28/02* (2006.01)
*C04B 103/30* (2006.01)

(52) U.S. Cl.
CPC .......... *C04B 24/2647* (2013.01); *C04B 28/02* (2013.01); *C08F 220/06* (2013.01); *C04B 2103/302* (2013.01)

(58) Field of Classification Search
CPC .......... C04B 24/2647; C04B 2103/302; C08F 220/06
USPC .......................................................... 524/5
See application file for complete search history.

(56) References Cited

U.S. PATENT DOCUMENTS

| | | | |
|---|---|---|---|
| 3,359,225 | A | 12/1967 | Weisend |
| 3,772,045 | A | 11/1973 | Haldas et al. |
| 4,258,790 | A | 3/1981 | Hale |
| 6,211,317 | B1 | 4/2001 | Albrecht et al. |
| 2011/0207855 | A1* | 8/2011 | Suau ................... C04B 24/2647 524/5 |

FOREIGN PATENT DOCUMENTS

| | | | |
|---|---|---|---|
| CN | 1148329 | C | 5/2004 |
| CN | 102140018 | * | 8/2011 |
| CN | 102140018 | A | 8/2011 |
| CN | 103965460 | A | 8/2014 |
| EP | 0 894 811 | A1 | 2/1999 |
| EP | 1 179 517 | A2 | 2/2002 |
| EP | 1 277 782 | A2 | 1/2003 |
| JP | 2006-282414 | A | 10/2006 |
| KR | 100860470 | B1 | 9/2008 |
| WO | 97/39037 | A1 | 10/1997 |
| WO | 97/44288 | A1 | 11/1997 |
| WO | 2006/028252 | A1 | 3/2006 |

* cited by examiner

*Primary Examiner* — Hui H Chin

(74) *Attorney, Agent, or Firm* — Oblon, McClelland, Maier & Neustadt, L.L.P.

(57) ABSTRACT

Novel copolymers obtained by polymerisation a mixture of monomers comprising: at least one anionic monomer (a) comprising a polymerisable unsaturated function and a carboxylic group; and at least one monomer (b) of formula (I):

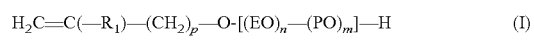

$$H_2C=C(-R_1)-(CH_2)_p-O-[(EO)_n-(PO)_m]-H \qquad (I)$$

where $[(EO)_n-(PO)_m]$ represents a polyalkoxylated chain consisting of ethoxylated units EO and propoxylated units PO, distributed into blocks, alternating or statistical, the molar proportion of the ethoxylated units in the polyalkoxylated chain (n)/(m+n) being greater than or equal to 70% and strictly less than 90%. In addition, hydraulic composition, for example concrete compositions, comprising such copolymers, and the use of said copolymers as water-reducing agents in hydraulic compositions and for increasing the early mechanical strength of a hydraulic composition.

20 Claims, No Drawings

COPOLYMER AS A WATER-REDUCING AGENT IN A HYDRAULIC COMPOSITION AND USE OF COPOLYMERS FOR IMPROVING THE EARLY MECHANICAL STRENGTH OF A HYDRAULIC COMPOSITION

CROSS-REFERENCE TO RELATED APPLICATIONS

The present application is a continuation-in-part application of PCT/FR2016/050571, filed on Mar. 15, 2016, the text of which is incorporated by reference, which claims priority to FR 1552126, filed on Mar. 16, 2015, the text of which is incorporated by reference, and a continuation-in-part of PCT/FR2016/050568, filed on Mar. 15, 2016, the text of which is incorporated by reference, which claims priority to FR 1552129, filed on Mar. 16, 2015, the text of which is incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF THE MATERIAL ON THE COMPACT DISC

Not applicable.

BACKGROUND OF THE INVENTION

Field of the Invention

The present invention relates to the field of hydraulic compositions. More particularly, the present invention relates to novel copolymers and to their use as water-reducing agents in hydraulic compositions, such as concrete and mortar compositions, and the use of specific copolymers for improving the early mechanical strength of hydraulic compositions.

Such hydraulic compositions are intended for all construction markets.

Description of the Related Art Including Information Disclosed Under 37 CFR 1.97 and 1.98

Hydraulic compositions generally comprise various chemical additives intended to improve or modulate their properties. Among these, "water-reducing" agents or "water reducers," also known as "dispersants," "dispersing agents," "fluidizers," "fluidifying agents," "plasticizers," or "superplasticizers," are well known and have been used for many years. These dispersants have the function of improving the state of dispersion of the mineral particles in the compositions. These dispersants lead to a reduction in the water content of hydraulic compositions, which makes it possible to improve the performance qualities of these compositions, and especially their mechanical strength.

A wide variety of dispersants for hydraulic compositions has already been proposed. These agents differ in their chemical composition and the properties induced within the compositions containing them.

Historically, the first compounds proposed as dispersants were lignosulfonates as described in U.S. Pat. No. 3,772,045. Polycondensates of formaldehyde and naphthalene or melamine sulfonates were then implemented, as illustrated in U.S. Pat. Nos. 3,359,225 and 4,258,790.

More recently, a novel family of dispersants, consisting of carboxylic comb polymers, has been developed. In general, these polymers generally have a (meth)acrylic backbone and side chains terminated with hydrophilic groups, for example polyoxyalkyl side groups.

By way of example, WO 97/39037 describes the synthesis of polymers of comb type, which may be used as water-reducing agents in cements, by polymerization using an acrylic monomer and a polyether macromonomer, such as an oxyethylene and oxypropylene (meth)acrylate.

Mention may also be made of the dispersing copolymers proposed in WO 2006/028252.

CN 1148329C also proposes, as dispersants for cements, copolymers obtained by polymerization from monocarboxylic acid monomer, such as (meth)acrylic acid and a polyalkylene glycol ether monomer in which the proportion of ethoxylated units is at least 90 mol % of all of the alkoxyl units, preferably a polyethylene glycol ether.

JP 2006/282414 relates to an agent for developing high strength for cement. It contains, as essential components, (a) glycerol or a glycerol derivative and (b) a polycarboxylic acid copolymer with a polyoxyalkylene compound on a side chain.

U.S. Pat. No. 6,211,317 describes emulsion copolymers of unsaturated carboxylic acid derivatives, of alkenyl oxyalkylene glycol ethers, of unsaturated dicarboximides or of amides and vinyl monomers. They are described for their use as additives for hydraulic binders, in particular for cement.

KR 100860470 describes copolymers of unsaturated monomers based on polyalkylene ether supplemented with at least two alkylene glycols and (meth)acrylate monomers. It describes their use as cement additives.

On the other hand, the workability of compositions, for example concrete compositions, increases with their water content. So it is essential to have good initial workability or fluidity of the hydraulic composition, for example of the concrete, in so far as this property conditions its use, for example for filling a shuttering. Workability may be evaluated by measuring the slump, in accordance with EN 12350-2 standard.

Consequently, generally, during the formulation of a hydraulic composition, the aim is to find a compromise between the mechanical properties and the workability of the hydraulic composition.

Better mechanical strength is one of the particularly desired properties during the evaluation of hydraulic compositions. Mechanical strength in hydraulic compositions may be measured at different times, for example at 1 day, at 7 days or at 28 days, where time T0 corresponds to the preparation of the hydraulic composition. In the scope of the present invention, the interest is more particularly early mechanical strength. High early mechanical strength is particularly desirable in the case of concreting in cold weather or also for fast onsite demolding.

This "early mechanical strength" property, also called "compressive strength at 1 day," is defined as the change in compressive strength as a function of the age of preparation of the hydraulic composition, in the zone T0 to T=1 day following the preparation of the hydraulic composition.

BRIEF SUMMARY OF THE INVENTION

The present invention is directed toward proposing novel dispersants for gaining access to better reduction of the water content of hydraulic compositions, without, however, impairing their fluidity or workability. The present invention also targets precisely improving the early strength, notably at 1 day, for hydraulic compositions without altering their initial fluidity or workability.

More particularly, according to a first aspect, the present invention relates to a copolymer obtained by polymerization using a monomer mixture comprising:
- at least one anionic monomer (a) comprising a polymerizable unsaturated function and a carboxylic group; and
- at least one monomer (b) of formula (I):

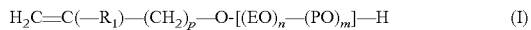

in which:
$R_1$ represents a hydrogen atom or a $CH_3$ group;
p is 1 or 2;
$[(EO)_n—(PO)_m]$ represents a polyalkoxyl chain made of ethoxyl units EO and propoxyl units PO, distributed in blocks, alternately or randomly,
m and n represent integers ranging between 1 and 250, the sum of m and n being greater than or equal to 10, with the proviso that the mole proportion of the ethoxyl units in the polyalkoxyl chain (n)/(m+n) is greater than or equal to 70% and strictly less than 90%.

A copolymer as defined above, comprising at least units derived from the anionic monomers (a) and units derived from the monomers (b) of formula (I), is referred to simply in the rest of the text as "copolymer according to the invention" or "copolymer according to the first aspect of the invention."

Surprisingly, the inventors have discovered that such a copolymer makes it possible to significantly reduce the amount of water in the hydraulic composition in which it is implemented.

Thus, advantageously, as illustrated in the experimental tests that follow, the copolymers according to the invention may be implemented as admixtures in hydraulic compositions as "water-reducing" agents, and even as "high-efficiency water-reducing" agents.

In the context of the present invention, the term "water-reducing" agent or "plasticizer" means an agent which, in accordance with standard ADMIXTURE NF EN 934-2, allows a water reduction for admixtured concrete of at least 5% relative to reference concrete. A "high-efficiency water-reducing agent" or "superplasticizer" is an admixture which allows a water reduction for admixtured concrete of at least 12% relative to reference concrete.

Moreover, this water reduction does not take place to the detriment of the performance qualities of the hydraulic composition, for example of the concrete, especially its fluidity or workability. In other words, the copolymers according to the first aspect of the invention allow, for the same workability, a reduction in the water content of a given hydraulic composition, such as a concrete.

As detailed in examples that follow, the dispersing properties of the water-reducing agent in the hydraulic composition may be evaluated by measuring the slump, in accordance with standard EN 12350-2. The greater the slump value, the more workable the hydraulic composition. Specifically, it is essential to preserve good initial workability of the hydraulic composition, for example of the concrete, insofar as this property conditions its implementation, for example for filling shuttering.

According to a second aspect, the present invention relates to the use for increasing the early mechanical strength of a hydraulic composition, notably at 1 day, of at least one copolymer obtained by polymerization from a mixture of monomers comprising:
- at least one anionic monomer (a) comprising a polymerizable unsaturated group and a carboxylic group and
- at least one monomer (b) of the following formula (I):

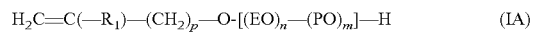

in which:
$R_1$ represents a hydrogen atom or a $CH_3$ group,
p is equal to 1 or 2,
$[(EO)_n—(PO)_m]$ represents a polyalkoxylated chain constituted of ethoxylated units EO and propoxylated units PO, distributed in blocks, alternating or random and
m and n represent integers varying between 1 and 250, the sum of m and n being greater than or equal to 10, provided that the molar proportion of the ethoxylated units in the polyalkoxylated chain (n)/(m+n) is strictly lower than 90%.

The copolymers used according to the second aspect of the invention, as defined above, comprising at least some units derived from anionic monomers (a) and some units derived from monomers (b) of formula (IA), are denoted more simply in the rest of the text as "copolymer according to the invention" or "compolymer according to the second aspect of the invention."

In the scope of the present invention, the "early" mechanical strength is more particularly understood to be the compressive strength at 24 hours (±15 minutes) after the preparation of the hydraulic composition. The compressive strength at 1 day may be measured according to EN 12390-3 standard.

"Improving" or "increasing" the early mechanical strength is understood more particularly, in the scope of the invention, by the use of the copolymer according to the second aspect of the invention as admixture in a hydraulic composition, to mean the fact of accessing increased compressive strength at 1 day (measured according to EN 12390-3 standard) of at least 4%, in particular of at least 4.5%, notably of at least 10%, preferably of at least 15% and more preferentially of at least 20%, by comparison with the strength value obtained with the use as admixture in a same hydraulic composition of a copolymer, not in accordance with the invention, of a similar composition with the exception of the fact that the polyalkoxylated chain of type (b) monomer units is a polyethylene glycol chain (100 mol % of ethoxylated units EO).

The use of copolymers according to this aspect of the invention allows faster development of early mechanical strength in hydraulic compositions that incorporate it. In other words, such copolymers may improve the short-term mechanical strength ("early age"), notably at 1 day, of the hydraulic compositions in which they are used.

As illustrated in the examples that follow, the copolymers according to the invention advantageously allow production of high early resistances, notably at 1 day.

More particularly, the use of a copolymer according to the second aspect of the invention in a hydraulic composition, for example a concrete composition, produces a compressive strength at 1 day (measured according to EN 12390-3 standard) of the admixtured hydraulic composition according to the invention greater than or equal to 155% of the value of the strength of the hydraulic composition devoid of copolymer according to the invention. In particular, the compressive strength at 1 day may be greater than or equal to 160%, notably greater than or equal to 170%, or even greater than or equal to 180% of the value of the strength of the hydraulic composition devoid of copolymer according to the invention.

The use of copolymers according to the invention proves, for example, to be particularly advantageous for concreting. The increased short-term mechanical resistances of the hydraulic composition, for example concrete, also allows for faster removal from shutterings and demolding.

Moreover, advantageously, this increase in early mechanical strength is not done to the detriment of other performances of the hydraulic composition, notably its initial fluidity or workability.

Other characteristics, advantages and modes of application of the copolymers according to the invention will emerge more clearly on reading the description and the example that follow, which are given as nonlimiting illustrations.

In the rest of the text, the expressions "between . . . and . . . ", "ranging from . . . to . . . " and "varying from . . . to . . . " are equivalent and are intended to mean that the limits are included, unless otherwise mentioned.

Unless otherwise mentioned, the expression "including/containing/comprising a(n)" should be understood as meaning "including/containing/comprising at least one".

DETAILED DESCRIPTION OF THE INVENTION

Copolymers of the Invention:

As indicated previously, the copolymer according to the first aspect of the present invention is obtained by polymerization using at least:

one or more anionic monomers comprising a polymerizable unsaturated function and a carboxylic group, noted as "monomers (a)" in the rest of the text; and one or more monomers of formula (I) below, noted as "monomers (b)" in the rest of the text,

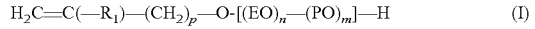  (I)

in which:
$R_1$ represents a hydrogen atom or a $CH_3$ group;
p is 1 or 2;
$[(EO)_n—(PO)_m]$ represents a polyalkoxyl chain made of ethoxyl units EO and propoxyl units PO, distributed in blocks, alternately or randomly,
m and n represent integers ranging between 1 and 250, the sum of m and n being greater than or equal to 10, with the proviso that the mole proportion of the ethoxyl units in the polyalkoxyl chain (n)/(m+n) is greater than or equal to 70% and strictly less than 90%.

As indicated previously, the second aspect of the present invention uses copolymers obtained by the polymerization of at least:

one or more anionic monomer(s) comprising a polymerizable unsaturated group and a carboxylic group, denoted "monomer(s) (a)" in the rest of the text and
one or more monomer(s) of the following formula (IA), denoted "monomer(s) (b)" in the rest of the text,

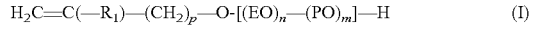  (I)

in which:
$R_1$ represents a hydrogen atom or a $CH_3$ group,
p is equal to 1 or 2,
$[(EO)_n—(PO)_m]$ represents a polyalkoxylated chain constituted of ethoxylated units EO and propoxylated units PO, distributed in blocks, alternating or random and m and n represent integers varying between 1 and 250, the sum of m and n being greater than or equal to 10, provided that the molar proportion of the ethoxylated units in the polyalkoxylated chain (n)/(m+n) is strictly lower than 90%.

The copolymers according to the invention may optionally comprise other polymerizable monomers. The optional monomers optionally included in the composition of the copolymers of the invention may be of varied nature, as detailed in the rest of the text.

In particular, said anionic monomers (a) and said monomers (b) of formula (I) may represent more than 80 mol %, in particular more than 90 mol %, and more particularly more than 95 mol %, of the total number of moles of monomers that constitute the copolymer. Similarly, said anionic monomers (a) and said monomers (b) of formula (IA) may represent more than 80 mol %, in particular more than 90 mol %, and more particularly more than 95 mol %, of the total number of moles of monomers that constitute the copolymer.

According to an implementation variant, the copolymers according to the invention are formed solely from units derived from the monomers (a) and (b). In other words, the copolymers according to the invention may be obtained by polymerization using a monomer mixture formed from one or more anionic monomers (a) and from one or more monomers (b) of formula (I) or a monomer mixture formed from one or more anionic monomers (a) and from one or more monomers (b) of formula (IA).

The distribution of the units derived from the monomers (a) and those derived from the monomers (b) in the copolymers according to the invention may be of block, alternating or random. According to one embodiment, it is a random or alternating distribution. According to another embodiment, it is a block distribution.

The copolymer according to the first aspect of the present invention may be obtained by polymerization using a monomer mixture consisting of:

at least one anionic monomer (a) comprising a polymerizable unsaturated function and a carboxylic group; and
at least one monomer (b) of formula (I):

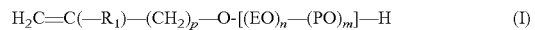  (I)

in which:
$R_1$ represents a hydrogen atom or a $CH_3$ group;
p is 1 or 2;
$[(EO)_n—(PO)_m]$ represents a polyalkoxyl chain made from ethoxyl units EO and propoxyl units PO, distributed in blocks, alternately or randomly,
m and n represent integers ranging between 1 and 250, the sum of m and n being greater than or equal to 10, with the proviso that the mole proportion of the ethoxyl units in the polyalkoxyl chain (n)/(m+n) is greater than or equal to 70% and strictly less than 90%.

The amounts of monomers (a) and (b) implemented then correspond to 100% by weight of the total amount of monomers forming the copolymer according to the invention.

Similarly, the copolymer used according to the second aspect of the invention may be obtained by polymerization from a mixture of monomers consisting of:

at least one anionic monomer (a) comprising a polymerizable unsaturated group and a carboxylic group and
at least one monomer (b) of formula (IA):

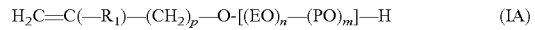  (IA)

in which:

$R_1$ represents a hydrogen atom or a $CH_3$ group, p is equal to 1 or 2, $[(EO)_n—(PO)_m]$ represents a polyalkoxylated chain constituted of ethoxylated units EO and propoxylated units PO, distributed in blocks, alternating or random and m and n represent integers varying between 1 and 250, the sum of m and n being greater than or equal to 10, provided that the molar proportion of the ethoxylated units in the polyalkoxylated chain (n)/(m+n) is greater than or equal to 70% and strictly lower than 90%.

Again, the amounts of monomers (a) and (b) used then correspond to 100% by weight of the total of the amounts of monomers forming the copolymer used according to the invention.

Anionic Monomer (a) Bearing a Polymerizable Unsaturated Function/Group and a Carboxylic Group:

The anionic monomers (a) included in the composition of the copolymers according to the invention may be chosen more particularly from acrylic acid, methacrylic acid, maleic acid, itaconic acid, crotonic acid, and mixtures of these monomers.

Said monomer(s) (a) may be in acid form, for example, carboxylic acid and/or in salt form, for example carboxylate salt.

It is understood that only one or a mixture of several different monomers (a) may be included in the composition of the copolymers according to the invention. For example, it may be a mixture of acrylic acid monomers and methacrylic acid monomers or alternatively a mixture of maleic acid, acrylic acid and methacrylic acid monomers.

According to a particular embodiment, the copolymers according to the invention are formed from at least acrylic acid and/or methacrylic acid, in particular from at least acrylic acid (AA).

According to an implementation variant, said anionic monomer(s) (a) included in the composition of the copolymers according to the invention are chosen from acrylic acid, methacrylic acid, and a mixture thereof.

According to a particular embodiment, said anionic monomer(s) (a) may represent from 50 mol % to 99 mol %, in particular from 60 mol % to 95 mol %, especially from 70 mol % to 95 mol % and more particularly from 80 mol % to 90 mol %, of the total number of moles of monomers that constitute the copolymers according to the invention.

Monomer (b) of Formulae (I) and (IA):

As indicated previously, the monomers (b) included in the composition of the copolymers according to the first aspect of the invention correspond to formula (I) below:

           (I)

in which:

$R_1$ represents a hydrogen atom or a $CH_3$ group;

p is 1 or 2;

$[(EO)_n—(PO)_m]$ represents a polyalkoxyl chain made of ethoxyl units EO and propoxyl units PO;

m and n represent integers ranging between 1 and 250, the sum of m and n being greater than or equal to 10, with the proviso that the mole proportion of the ethoxyl units in the polyalkoxyl chain (n)/(m+n) is greater than or equal to 70% and strictly less than 90%.

Similarly, the monomers (b) entering in the composition of the copolymer used according to the second aspect of the invention correspond to the following formula (IA):

           (IA)

in which:

$R_1$ represents a hydrogen atom or a $CH_3$ group, p is equal to 1 or 2, $[(EO)_n—(PO)_m]$ represents a polyalkoxylated chain constituted of ethoxylated units EO and propoxylated units PO and m and n represent integers varying between 1 and 250, the sum of m and n being greater than or equal to 10, provided that the molar proportion of the ethoxylated units in the polyalkoxylated chain (n)/(m+n) is strictly lower than 90%.

The terms "polyalkoxyl" and "polyalkoxylated" chain mean a poly(alkylene glycol) chain. The term "poly(alkylene glycol)" means a polymer of an alkylene glycol derived from an olefinic oxide.

The poly(alkylene glycol) chain of the monomers (b) according to the invention is formed from ethoxyl ("ethoxylated" or "ethylene-oxy") units, denoted "EO", of formula —$CH_2$—$CH_2$—O— and from propoxyl ("propoxylated" or "propylene-oxy") units, denoted "PO", of formula —$CH_2$—$CH(CH_3)$—O—.

The schematic representation "$[(EO)_n—(PO)_m]$" makes no assumption as to the order of the ethoxyl and propoxyl units in the polyalkoxyl chain. Specifically, the polyalkoxyl chain may have a distribution of the EO and PO units of block, random or alternating type.

According to a particular embodiment, the EO and PO units are distributed in blocks. In particular, the polyalkoxyl chain of the monomer (b) may be of diblock type and may be formed from a polyoxyethylene block and from a polyoxypropylene block.

According to an implementation variant, p in the abovementioned formulae (I) and (IA) is 1.

In other words, according to this embodiment variant, said monomer(s) (b) included in the composition of the copolymers according to the first aspect of the invention correspond to formula (I') below:

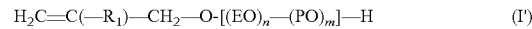           (I')

in which $R_1$, n and m are as defined previously for formula (I).

Likewise, according to this variant of embodiment, said monomer(s) (b) entering in the composition of the copolymer used in the second aspect of the invention correspond to the following formula (IA'):

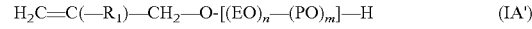           (IA')

in which $R_1$, n and m are as defined previously for formula (IA).

According to a particular embodiment, the copolymers according to the first aspect of the invention are formed from at least one monomer (b) of the abovementioned formula (I) or (I'), in which $R_1$ represents a methyl group.

According to another specific embodiment, the copolymers used according to the second aspect of the invention are formed from at least one previously cited monomer (b) of formula (IA) or (IA'), in which $R_1$ represents a methyl group.

In particular, according to a particular embodiment, the copolymers according to first aspect of the invention and the copolymers used in the second aspect of the invention are formed from at least one monomer (b) of formula (II) below:

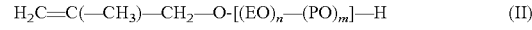           (II)

in which n and m are as defined previously for formula (I) and (IA), respectively. As indicated previously, the schematic representation "$[(EO)_n—(PO)_m]$" makes no assumption as to the order of the ethoxyl and propoxyl units in the polyalkoxyl chain. The polyalkoxyl chain may have a distribution of the EO and PO units of block, random or alternating type, in particular of block type.

According to one particular embodiment, the copolymers according to the first aspect of the invention and the copolymers used according to the second aspect of the invention are obtained from at least one monomer (b) of formula (III) below:

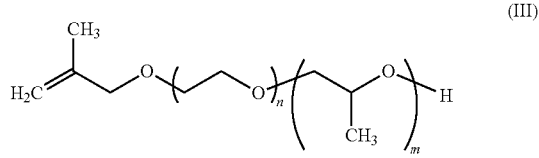

m and n being as defined previously formula (I) and (IA), respectively.

In the abovementioned formula (III), the polyalkoxyl chain is formed from a first polyoxyethylene block and from a second polyoxypropylene block.

According to another implementation variant, p in the abovementioned formulae (I) and (IA) is 2.

In other words, according to this implementation variant, said monomer(s) (b) included in the composition of the copolymers according to the first of the invention correspond to formula (I") below:

$$H_2C=C(-R_1)-CH_2-CH_2-O-[(EO)_n-(PO)_m]-H \qquad (I'')$$

in which $R_1$, n and m are as defined previously for formula (I).

Likewise, according to this variant of embodiment, said monomer(s) (b) entering in the composition of the copolymer according to the second aspect of the invention correspond to the following formula (IA"):

$$H_2C=C(-R_1)-CH_2-CH_2-O-[(EO)_n-(PO)_m]-H \qquad (IA'')$$

in which $R_1$, n and m are as defined previously for formula (IA).

According to a particular embodiment, the copolymers according to the first aspect of the invention are formed from at least one monomer (b) of the abovementioned formula (I"), in which $R_1$ represents a methyl group. According to another specific embodiment, the copolymer used according to the second aspect of the invention is formed from at least one previously cited monomer (b) of formula (IA"), in which $R_1$ represents a methyl group.

According to a particular embodiment, the copolymers according to the first aspect of the invention and the copolymers used according to the second aspect of the invention are formed from at least one monomer (b) of formula (IV) below:

$$H_2C=C(-CH_3)-CH_2-CH_2-O-[(EO)_n-(PO)_m]-H \qquad (IV)$$

in which n and m are as defined previously for formula (I) and (IA), respectively.

As indicated previously, the schematic representation "[(EO)$_n$—(PO)$_m$]" makes no assumption as to the order of the ethoxyl and propoxyl units in the polyalkoxyl chain. The polyalkoxyl chain may have a distribution of the EO and PO units of block, random or alternating type, in particular of block type.

According to a particular embodiment, the copolymers according to the first aspect of the invention and the copolymers used according to the second aspect of the invention are obtained from at least one monomer (b) of formula (V) below:

$$H_2C=C(-CH_3)-CH_2-CH_2-O-(EO)_n-(PO)_m-H \qquad (V)$$

m and n being as defined previously for formula (I) and (IA), respectively.

In the abovementioned formula (V), the polyalkoxyl chain is formed from a first polyoxyethylene block and from a second polyoxypropylene block.

As for the anionic monomers (a), it is understood that only one or a mixture of several different monomers (b) may be included in the composition of the copolymers according to the invention.

Thus, according to a particular embodiment, the copolymers according to the first aspect of the invention are obtained from at least one mixture of at least one monomer ($b_1$) of formula (I) in which $R_1$ represents a hydrogen atom and from at least one monomer ($b_2$) of formula (I) in which $R_1$ represents a methyl group. In a similar embodiment, the copolymers used according to the second aspect of the invention are obtained from at least a mixture of at least one monomer ($b_1$) of formula (IA) in which $R_1$ represents a hydrogen atom and of at least one monomer ($b_2$) of formula (IA) in which $R_1$ represents a methyl group.

In particular, the copolymers according to the first aspect of the invention may be obtained from at least one mixture of at least one monomer ($b_1'$) of the abovementioned formula (I'), in which $R_1$ represents a hydrogen atom and from at least one monomer ($b_2'$) of the abovementioned formula (I'), in which $R_1$ represents a methyl group (in other words, a monomer ($b_2'$) of the abovementioned formula (II)). Similarly, the copolymer used according to the second aspect of the invention may be obtained from at least a mixture of at least one monomer ($b_1'$) of previously cited formula (IA') in which $R_1$ represents a hydrogen atom and of at least one monomer ($b_2'$) of previously cited formula (IA') in which $R_1$ represents a methyl group (in other words, a monomer ($b_2'$) of previously cited formula (II)).

In the context of this particular embodiment, said monomer(s) ($b_1'$) and said monomer(s) ($b_2'$) included in the composition of the copolymer according to the first aspect of the invention or the copolymers used according to the second aspect of the invention may be implemented in a molar ratio of monomer(s) ($b_1'$)/monomer(s) ($b_2'$) ranging from 10 to 0.01, in particular from 1 to 0.1.

According to yet another particular embodiment, the copolymer according to the first aspect of the invention may be obtained from at least one mixture of at least one monomer ($b_1'$) of the abovementioned formula (I') and from at least one monomer ($b_2''$) of the abovementioned formula (I"). In particular, the copolymer according to the first aspect of the invention may be obtained from at least one mixture of at least one monomer ($b_1'$) of the abovementioned formula (I') in which $R_1$ represents a methyl group (in other words, a monomer ($b_1'$) of the abovementioned formula (II)) and from at least one monomer ($b_2''$) of the abovementioned formula (I") in which $R_1$ represents a methyl group (in other words, a monomer ($b_2''$) of the abovementioned formula (IV)).

Similarly, according to another specific embodiment, the copolymer used according to the second aspect of the invention may be obtained from at least a mixture of at least one monomer ($b_1'$) of previously cited formula (IA') and of at least one monomer (b₂") of previously cited formula (IA"). In particular, the copolymer used according to the second aspect of the invention may be obtained from at least a mixture of at least one monomer (b₁') of previously cited formula (IA') in which R₁ represents a methyl group (in other words, a monomer (b₁') of previously cited formula (II)) and of at least one monomer (b₂") of previously cited formula (IA") in which R₁ represents a methyl group (in other words, a monomer (b₂") of previously cited formula (IV)).

According to an essential characteristic of said monomer(s) (b) included in the composition of the copolymer according to the first aspect of the invention, the mole proportion of the ethoxyl units EO in the polyalkoxyl chain (i.e. (n)/(m+n) in the abovementioned formula (I), (I'), (II) or (III)) is greater than or equal to 70% and strictly less than 90%. In particular, the mole proportion of the ethoxyl units EO in the polyalkoxyl chain may be between 70% and 88%, in particular greater than or equal to 72%, and more particularly greater than or equal to 75%. According to a particular embodiment, the mole proportion of the ethoxyl units EO in the polyalkoxyl chain may be less than or equal to 85%, in particular less than or equal to 80%.

According to an essential characteristic of said monomer(s) (b) entering in the composition of the copolymer according to the second aspect of the invention, the molar proportion of ethoxylated units EO in the polyalkoxylated chain (i.e. (n)/(m+n) in the previously cited formula (IA), (IA'), (II) or (III)) is strictly lower than 90%. According to a specific embodiment, the molar proportion of ethoxylated units EO in the polyalkoxylated chain is greater than or equal to 70%. In particular, the molar proportion of ethoxylated units EO in the polyalkoxylated chain may be comprised between 70% and 88%, in particular be greater than or equal to 72%, and more particularly greater than or equal to 75%. According to a specific embodiment, the molar proportion of ethoxylated units EO in the polyalkoxylated chain may be lower than or equal to 85%, in particular lower than or equal to 80%. According to another specific embodiment, the molar proportion of ethoxylated units EO in the polyalkoxylated chain may be greater than or equal to 80%, in particular greater than or equal to 85%. It may for example be about 88%.

In the first aspect of the invention, the mole ratio between the ethoxyl units and the propoxyl units in the polyalkoxyl chain may be more particularly between 2.5 and 8, in particular between 2.8 and 7.5 and especially between 3 and 6.

In the second aspect of the invention, the molar ratio between the ethoxylated units and the propoxylated units of the polyalkoxylated chain may be more particularly comprised between 2.5 and 8, in particular between 2.8 and 7.5, notably between 6 and 7.5.

As indicated previously, the total number of ethoxyl and propoxyl units in the polyalkoxyl chain (in other words the sum of m and n) of the monomer (b) is greater than or equal to 10.

According to a particular embodiment, it may be between 10 and 150, in particular between 18 and 110 and more particularly between 20 and 70.

The polyalkoxyl chain of the monomer (b) according to the invention may thus have a number-average molar mass of between 450 and 7,500 g/mol, in particular between 900 and 5,500 g/mol and more particularly between 1,000 and 3,500 g/mol.

It is understood that the different variants and particular embodiments given above may be combined, as far as is possible, to define other variants or particular embodiments.

The monomers (b) according to the invention may be prepared via techniques known to those skilled in the art, by increasing the desired polyalkoxyl chain by polymerization using ethylene oxide and propylene oxide monomers on an allylic or methallylic alcohol.

According to a particular embodiment, said monomer(s) (b) may represent from 1 mol % to 50 mol %, in particular from 5 mol % to 40 mol %, especially from 5 mol % to 30 mol % and more particularly from 10 mol % to 20 mol %, of the total number of moles of monomers that constitute the copolymers according to the invention.

Said monomer(s) (b) may be implemented in various forms, especially in solid form, in particular in powder or flake form, or in liquid form (liquid formed from the monomers (b), or aqueous solution of the monomers (b)). In particular, the monomers (b) are water-soluble. Preferably, said monomer(s) (b) are implemented in liquid form, in particular as an aqueous solution, this form being particularly suitable for the synthesis of the copolymer according to the invention.

The molar ratio between said anionic monomer(s) (a) and said monomer(s) (b) included in the composition of the copolymer according to the invention may more particularly be between 1 and 99, in particular between 2.3 and 19 and more particularly between 4 and 9.

Optional Monomers:

As indicated previously, the copolymers according to the first aspect of the invention and the copolymers used according to the second aspect of the invention may be obtained by polymerization using a monomer mixture comprising, besides said monomer(s) (a) and said monomer(s) (b), one or more additional monomers, different from the monomers (a) and (b), noted "monomers (c)" in the rest of the text.

The additional monomers (c) may be chosen more particularly from:
  2-acrylamino-2-methylpropane sulfonic acid (AMPS);
  vinylsulfonates, in particular sodium styrene sulfonate;
  amines;
  esters containing a hydroxyl group, for example hydroxyethyl methacrylate (HEMA); hydroxyethyl acrylate; hydroxypropyl methacrylate and hydroxypropyl acrylate;
  alkylene glycol acrylate or methacrylate phosphates, in particular ethylene glycol methacrylate phosphate or ethylene glycol acrylate phosphate;
  acrylamide or methacrylamide;
  phosphonic monomers, such as vinylphosphonates, alkyl vinylphosphonates and alkyl phosphonates;
  macromonomers of formula (VI) below:

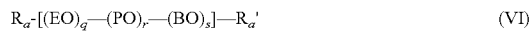

$$R_a\text{-}[(EO)_q\text{—}(PO)_r\text{—}(BO)_s]\text{—}R_a' \qquad (VI)$$

in which:
  $[(EO)_q\text{—}(PO)_r\text{—}(BO)_s]$ represents a polyalkoxyl chain made of alkoxyl units, distributed in blocks, alternately or randomly, chosen from ethoxyl units EO, propoxyl units PO and butoxyl units BO;
  q, r and s represent, independently of each other, 0 or an integer ranging between 1 and 250, the sum of m, n and p being between 10 and 250;
  $R_a$ represents a radical chosen from the group consisting of acrylic esters, methacrylic esters and a mixture of these esters; and
  $R_a'$ represents hydrogen or an alkyl group containing from 1 to 4 carbon atoms;

hydrophobic monomers of formula (VII) below:

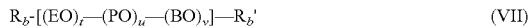

$R_b\text{-}[(EO)_t\text{—}(PO)_u\text{—}(BO)_v]\text{—}R_b'$ (VII)

in which: $[(EO)_t\text{—}(PO)_u\text{—}(BO)_v]$ represents a polyalkoxyl chain made of alkoxyl units, distributed in blocks, alternately or randomly, chosen from ethoxyl units EO, propoxyl units PO and butoxyl units BO;

t, u and v represent, independently of each other, 0 or an integer ranging between 1 and 250, the sum of m, n and p being between 10 and 250;

$R_b$ represents a radical chosen from the group consisting of acrylic esters, methacrylic esters and a mixture of these esters; and $R_b'$ represents an alkyl group containing from 8 to 40 carbon atoms; and crosslinking monomers.

According to a particular embodiment, in the abovementioned formula (VI), s is equal to 0; and q and r represent an integer ranging between 1 and 250, for example between 10 and 150 or between 10 and 100.

According to a particular embodiment, in the abovementioned formula (VII), v is equal to 0; and t and u represent an integer ranging between 1 and 250, for example between 10 and 150 or between 10 and 100.

Said additional monomer(s) (c) may also be chosen from crosslinking monomers. The copolymer according to the invention may, for example, comprise a single crosslinking monomer. According to another embodiment, it comprises two different crosslinking monomers. The crosslinking monomer may have a hydrophilic, hydrophobic or amphiphilic nature.

Examples of these compounds include di(meth)acrylate compounds such as polyalkylene glycol di(meth)acrylate, especially polypropylene glycol di(meth)acrylate, ethylene glycol di(meth)acrylate, polyethylene glycol di(meth)acrylate, triethylene glycol di(meth)acrylate, 1,3-butylene glycol di(meth)acrylate, 1,6-butylene glycol di(meth)acrylate, 1,6-hexanediol di(meth)acrylate, neopentyl glycol di(meth)acrylate, 1,9-nonanediol di(meth)acrylate, but also 2,2'-bis(4-(acryloxypropyloxyphenyl)propane, 2,2'-bis(4-(acryloxydiethoxyphenyl)propane and zinc acrylate; tri(meth)acrylate compounds such as trimethylolpropane tri(meth)acrylate, trimethylolethane tri(meth)acrylate, pentaerythritol tri(meth)acrylate and tetramethylolmethane tri(meth)acrylate; tetra(meth)acrylate compounds such as ditrimethylolpropane tetra(meth)acrylate, tetramethylolmethane tetra(meth)acrylate and pentaerythritol tetra(meth)acrylate; hexa(meth)acrylate compounds such as dipentaerythritol hexa(meth)acrylate; penta(meth)acrylate compounds such as dipentaerythritol penta(meth)acrylate; allyl compounds such as allyl (meth)acrylate, diallyl phthalate, diallyl itaconate, diallyl fumarate and diallyl maleate; polyallyl sucrose ethers containing from 2 to 8 groups per molecule, polyallyl pentaerythritol ethers such as pentaerythritol diallyl ether, pentaerythritol triallyl ether and pentaerythritol tetraallyl ether; polyallyl trimethylolpropane ethers such as diallyl trimethylolpropane ether and triallyl trimethylolpropane ether. Other polyunsaturated compounds include divinyl glycol, divinylbenzene, divinylcyclohexyl and methylenebisacrylamide.

According to another aspect, the crosslinking monomers may be prepared via an esterification reaction of a polyol with an unsaturated anhydride such as maleic anhydride, itaconic anhydride or (meth)acrylic anhydride, or via an addition reaction with an isocyanate such as 3-isoprepenyldimethylbenzene isocyanate.

Use may also be made of the following compounds to obtain crosslinking monomers: polyhaloalkanols such as 1,3-dichloroisopropanol and 1,3-dibromoisopropanol; haloepoxyalkanes such as epichlorohydrin, epibromohydrin, 2-methylepichlorohydrin and epiiodohydrin; polyglycidyl ethers such as 1,4-butanediol diglycidyl ether, glycerine 1,3-diglycidyl ether, ethylene glycol diglycidyl ether, propylene glycol diglycidyl ether, diethylene glycol diglycidyl ether, neopentyl glycol diglycidyl ether, polypropylene glycol diglycidyl ether, bisphenol A-epichlorohydrin epoxy resin, and mixtures thereof.

According to a particular embodiment, the crosslinking monomer is chosen from (meth)acrylates bearing at least two polymerizable ethylenically unsaturated double bonds (prepared, for example, by esterification of (meth)acrylic acid with a linear or branched polyol containing from 2 to 12 carbon atoms and at least two hydroxyl groups), polyalkenyl polyether containing at least two polymerizable ethylenically unsaturated double bonds (prepared, for example, by etherification of alkenyl halide with a linear or branched polyol containing from 2 to 12 carbon atoms and at least two hydroxyl groups) and mixtures of these crosslinking monomers.

According to one embodiment of the present invention, the copolymer comprises two crosslinking monomers:
said first crosslinking monomer being a (meth)acrylate containing at least two polymerizable ethylenically unsaturated double bonds (prepared, for example, by esterification of (meth)acrylic acid with a linear or branched polyol containing from 2 to 12 carbon atoms and at least two hydroxyl groups), and
said second crosslinking monomer being a polyalkenyl polyether containing at least two polymerizable ethylenically unsaturated double bonds (prepared, for example, by etherification of alkenyl halide with a linear or branched polyol containing from 2 to 12 carbon atoms and at least two hydroxyl groups).

According to another embodiment, the copolymer comprises two crosslinking monomers of different nature, for example trimethylolpropane tri(meth)acrylate (TMPTA or TMPTMA) and trimethylolpropane diallyl ether (TMPDAE).

It is understood that the content of additional monomer(s) implemented, for example of crosslinking monomer(s), is adjusted so as not to alter the desired properties of the copolymer.

In general, said additional monomer(s) (c) may represent less than 20 mol %, in particular less than 15 mol %, especially less than 10 mol % and more particularly less than 5 mol % of the total number of moles of monomers that constitute the copolymer according to the invention.

The various particular modes described for each of the monomers included in the composition of the copolymer according to the invention may be combined.

According to a particular embodiment, the copolymers according to the first aspect of the invention and the copolymers used according to the second aspect of the invention may thus be obtained by polymerization using a monomer mixture comprising, or even being formed from:
one or more anionic monomers (a) chosen from acrylic acid, methacrylic acid and mixtures thereof, in particular acrylic acid; and
one or more monomers (b) of the abovementioned formula (I') or formula (IA'), respectively, in particular of the abovementioned formula (II), in which the ethoxyl and propoxyl units are more particularly distributed in blocks.

According to a particular embodiment, the copolymers according to the first aspect of the invention and the copolymers used according to the second aspect of the invention comprise at least units derived from acrylic acid and units derived from a monomer of formula (II), in particular of formula (III), as described previously.

According to a first particular embodiment, the copolymers according to the first aspect of the invention and the copolymers used according to the second aspect of the invention comprise are obtained by polymerization of at least:
  50 mol % to 99 mol % of at least one anionic monomer (a), in particular as defined previously; and
  1 mol % to 50 mol % of at least one monomer (b) of formula (I) or formula (IA), respectively, in particular as defined previously,
the molar percentages of each monomer being expressed relative to the total number of moles of monomers that constitute the copolymer.

According to a second particular embodiment, the copolymers according to the first aspect of the invention and the copolymers used according to the second aspect of the invention comprise are obtained by polymerization of at least:
  70 mol % to 95 mol % of at least one anionic monomer (a), in particular as defined previously; and
  5 mol % to 30 mol % of at least one monomer (b) of formula (I) or formula (IA), respectively, in particular as defined previously;
the molar percentages of each monomer being expressed relative to the total number of moles of monomers that constitute the copolymer.

According to a third particular embodiment, the copolymers according to the first aspect of the invention and the copolymers used according to the second aspect of the invention comprise are are obtained by polymerization of at least:
  80 mol % to 90 mol % of at least one anionic monomer (a), in particular as defined previously; and
  10 mol % to 20 mol % of at least one monomer (b) of formula (I) or formula (IA), respectively, in particular as defined previously;
the molar percentages of each monomer being expressed relative to the total number of moles of monomers that constitute the copolymer.

According to these three particular embodiments, the sum of the molar percentages of the monomers (a) and of the monomers (b) is equal to 100%. In other words, the copolymer is, according to these three embodiments of the invention, formed solely from units derived from the monomers (a) and (b) in the indicated molar proportions.

The copolymer according to the invention may have a weight-average molecular mass Mw of between 15,000 g/mol and 250,000 g/mol, in particular between 20,000 g/mol and 200,000 g/mol and more particularly between 25,000 g/mol and 175,000 g/mol. The weight-average molecular mass or Mw may be determined by size exclusion chromatography (SEC), as described more precisely in the example that follows.

The copolymers according to the invention may be prepared in the form of salts, which may or may not be stoichiometric, and may or may not be mixed, and made with alkali metals, alkaline-earth metals, amines or quaternary ammoniums. According to a particular embodiment, the copolymer according to the invention is in acid form. According to another embodiment, the copolymer according to the invention is in neutralized form. According to yet another embodiment, the copolymer according to the invention is in partially or totally neutralized form.

According to a particular embodiment, the copolymer is neutralized with an ion chosen from the group consisting of the potassium ion, the sodium ion, the lithium ion, the calcium ion, the magnesium ion, the ammonium ion, the diethanolammonium ion, and a mixture of these ions.

The copolymer according to the invention may be prepared via conventional polymerization techniques using the monomers (a), (b) and optionally (c).

According to an implementation variant, the copolymer according to the invention may be obtained by free radical polymerization, especially by controlled free radical polymerization.

Areas of Application:

As mentioned previously, the copolymers according to the invention are particularly efficient as water-reducing agents in hydraulic compositions.

According to another of its aspects, the invention thus relates to the use of a copolymer according to the first aspect of the invention as a water-reducing agent in a hydraulic composition.

The invention also relates to a water-reducing agent for hydraulic compositions comprising, or even consisting of, one or more copolymers according to the first aspect of the invention. Preferably, the water-reducing agent consists of a copolymer or a mixture of copolymers according to first aspect of the invention.

The water-reducing agent may be implemented in various forms, in particular in liquid form. It may especially be in the form of an aqueous solution of one or more copolymers according to the first aspect of the invention, the solids content of which may more particularly be between 25 and 65%, for example between 30 and 60%.

As mentioned previously, the copolymers according to the invention prove to be particularly effective for increasing the early mechanical strength of hydraulic compositions.

Accordingly, the invention also relates to a method for increasing the early mechanical strength, and notably at 1 day, of a hydraulic composition comprising the addition to said hydraulic composition of at least one copolymer according to the second aspect of the invention.

The admixed hydraulic composition according to the invention has faster development of early mechanical strength, notably at 1 day. Advantageously, the strength at 1 day (measured according to EN 12390-3 standard) of the hydraulic composition admixed according to the invention may be greater than or equal to 155% of the value of the strength of the hydraulic composition devoid of copolymer according to the invention. In particular, it may be greater than or equal to 160%, notably greater than or equal to 170%, and more particularly greater than or equal to 180% of the value of the strength of the hydraulic composition devoid of copolymer according to the invention.

Accordingly, the invention relates to the use of at least one copolymer according to the second aspect of the invention as an admixture in a hydraulic composition, for example a concrete composition, for increasing the rate of development of the early mechanical strength, notably at 1 day.

The admixture according to the invention may be used in different forms, in particular in liquid form. It may notably be presented in the form of an aqueous solution of one or more copolymer(s) according to the second aspect of the invention, of which the solids content may be more particularly comprised between 25% and 65%, for example between 30% and 60%.

According to another of its aspects, the invention relates to the use of a copolymer according to the second aspect of the invention as a water reducing agent in a hydraulic composition. It also relates to a water reducing agent for hydraulic compositions comprising, or even consisting of, one or more copolymer(s) according to the second aspect of the invention.

The water reducing agent according to the invention, as well as allowing a reduction of the amount of water in the hydraulic composition in which it is used, advantageously allows the faster development of early mechanical strength, notably at 1 day.

According to yet another of its aspects, the invention relates to a hydraulic composition comprising at least one copolymer according to the invention.

The hydraulic compositions may be of diverse nature. They may be intended for the manufacture of a grout, a putty, a coating, an adhesive, a concrete or a mortar. They may comprise impurities, for example clays. These compositions may especially comprise latexes, fibers, organic aggregates, organic granulates, inorganic aggregates, inorganic granulates, fillers or charges and/or $CaCO_3$.

The hydraulic compositions, for example the concrete and mortar compositions, for which the water-reducing agent according to the invention may be useful may comprise as hydraulic binder various types of cements, for instance the cements CEM I, CEM II, CEM III, CEM IV and CEM V as described in standard EN 197-1. Among these, the cements CEM I do not comprise any additive. It is, nevertheless, possible to add to these cements slags, fly ash, lime fillers or charges, calcium fillers, or siliceous fillers or charges. The concrete compositions may be concretes of different strength classes, such as C20/25 to C100/115.

The hydraulic composition may be more particularly an aqueous formulation comprising, besides said copolymer(s) according to the invention, water and at least one hydraulic binder. It may also optionally comprise one or more additional additives.

The hydraulic binder may comprise at least one cement, for example a Portland cement. Examples that may also be mentioned include hydraulic binders of aluminous cement type and sulfo-alumino calcic cement.

The hydraulic composition may be, for example, a ready-mix concrete.

The hydraulic composition according to the invention may comprise, for example, from 8% to 75% by weight, for example from 10% to 50% or from 10% to 40% by weight of hydraulic binder, relative to the total weight of the hydraulic composition.

The water-reducing agent according to the invention may, for example, be incorporated at the time of mixing of the concrete.

The water-reducing agent according to the invention may be implemented in a proportion of from 0.05% to 3% by weight of copolymer(s), in particular from 0.25% to 2.5% by weight, relative to the total weight of the composition. It falls to a person skilled in the art to adjust the amount of water-reducing agent according to the invention with regard to the targeted hydraulic composition. The dosing of the water-reducing agent depends mainly on the amount of hydraulic binder in the hydraulic composition.

Similarly, copolymer(s) according to the invention may be added to the other constituents of the hydraulic composition when it is manufactured. Said copolymer(s) may be used according to the invention at 0.05% to 3% by weight, in particular from 0.25% to 2.5% by weight relative to the total weight of the hydraulic composition.

According to a particular embodiment, the hydraulic composition according to the invention comprises, relative to the total weight of the composition:
from 2% to 15% by weight of water;
from 10% to 30% by weight of hydraulic binder comprising a cement; and
from 0.05% to 3% by weight of one or more copolymers according to the invention.

According to this embodiment, the hydraulic composition according to the invention may also comprise, in addition, from 10% to 60% by weight of sand.

According to a particular embodiment, the hydraulic composition according to the invention may comprise, relative to the total weight of the composition:
from 2% to 15% by weight of water;
from 10% to 30% by weight of hydraulic binder comprising a cement;
from 0.05% to 3% by weight of one or more copolymers according to the invention;
from 10% to 60% by weight of sand; and
from 10% to 60% by weight of one or more gravels.

Needless to say, the invention is not in any way limited to these particular embodiments.

A hydraulic composition according to the invention may comprise various ingredients conventionally implemented in the field of hydraulic compositions, chosen in particular from sand, gravels, aggregates or granulates, fine or ultrafine fillers or charges, for example calcium carbonate or silica, anti-foaming agents, thickeners, stabilizers, biocidal or anti-bacterial agents, and setting accelerators or retarders.

The present invention also relates to the use of a water-reducing agent according to the invention for preparing a hydraulic composition in particular comprising water and a hydraulic binder itself comprising a cement.

The present invention also relates to the use of one or more copolymer(s) as described previously for the preparation of a hydraulic composition advantageously presenting high early mechanical strength, notably at 1 day.

The invention will now be described by means of the examples that follow, which are given as a nonlimiting illustrations of the invention.

EXAMPLES

1. Preparation of the hydraulic compositions:
1.1. Preparation of the copolymers:
Measurement of the Molecular Mass of the Copolymers:
The molecular mass of the copolymers is determined by size exclusion chromatography (SEC).

Such a technique implements a WATERS™ brand liquid chromatography machine equipped with two detectors. One of these detectors combines static dynamic light scattering at an angle of 90° with the viscometry measured with a VISCOTEK™ MALVERN™ viscometer detector. The other of these detectors is a WATERS™ brand refractometric concentration detector.

This liquid chromatography machine is equipped with size exclusion columns suitably chosen by a person skilled in the art so as to separate the various molecular weights of the polymers studied. The liquid elution phase is an aqueous phase containing 1% $KNO_3$.

In a detailed manner, in a first step, 0.9% by dry weight of the polymerization solution is diluted in the SEC eluent, which is a 1% $KNO_3$ solution. The resulting solution is then filtered through a 0.2 μm filter. 100 μL are then injected into the chromatography machine (eluent: 1% $KNO_3$ solution).

The liquid chromatography machine contains an isocratic pump (WATERS™515) whose flow rate is set at 0.8 ml/min. The chromatography machine also comprises an oven, which itself comprises in series the following column system: a WATERS™ ULTRAHYDROGEL GUARD COLUMN precolumn 6 cm long and with an inside diameter of 40 mm, a WATERS™ ULTRAHYDROGEL linear column 30 cm long and with an inside diameter of 7.8 mm, and two WATERS™ 120 ANGSTROM ULTRAHYDROGEL columns 30 cm long and with an inside diameter of 7.8 mm. The detection system, for its part, is composed firstly of a WATERS™ RI 410 refractometric detector and secondly of a MALVERN™ 270 DUAL DETECTOR viscometer and 90° angle light scattering dual detector. The oven is brought to a temperature of 55° C., and the refractometer is brought to a temperature of 45° C. The chromatography machine is calibrated with a single 19k PEO standard of MALVERN™ PolyCAL™ type.

Copolymer A (Not in Accordance with the Invention):
Copolymer A is obtained by polymerization using a monomer mixture formed from:
  85.9 mol % of acrylic acid; and
  4.1 mol % of methallyl polyethylene glycol (Mw=2,400 g/mol).
Protocol for Synthesizing Copolymer A:
The chemical products used are:
  0.33 g of iron sulfate (FeSO$_4$•7H$_2$O),
  6.0 g of DMDO (1,8-dimercapto-3,6-dioxaoctane, CAS No.: 14970-87-7),
  891.8 g of 60% methallyl polyethylene glycol (Mw=2400 g/mol),
  97.5 g of acrylic acid,
  16.8 g of 35% aqueous hydrogen peroxide solution,
  16.9 g of 40% sodium bisulfite.

The iron sulfate, 20% of the DMDO and 90% of the 60% methallyl polyethylene glycol are introduced into the reactor containing 150 g of water. The reactor is heated to 55-60° C. Acrylic acid, a solution containing the remainder of the DMDO and of the 60% methallyl polyethylene glycol, the aqueous hydrogen peroxide solution and a sodium bisulfite solution are injected in parallel into the reactor over 1 hour 40 minutes. The injection tubes are rinsed with 120 g of water and the reactor is maintained at a temperature of 58-62° C. for 1 hour 30 minutes.

The product is cooled and then neutralized by adding 109.4 g of 50% NaOH.

Copolymer A obtained has a molecular mass, measured as described previously, of 160,300 g/mol.

Copolymer B (In Sccordance with the Invention):
Copolymer B is obtained by polymerization using a monomer mixture formed from:
  83.4 mol % of acrylic acid; and
  16.6 mol % of monomers (b) of formula (I') in which R$_1$ represents CH$_3$ and the polyalkoxyl chain, with a mean molar mass of 1990 g/mol, is formed to 75 mol % from ethoxyl units and 25 mol % of propoxyl units, the ethoxyl and propoxyl units being distributed in blocks.
Protocol for Synthesizing Copolymer B:
The chemical products used are:
  0.31 g of iron sulfate (FeSO$_4$•7H$_2$O),
  2.0 g of DMDO,
  297.3 g of monomers (b),
  32.5 g of acrylic acid,
  8.4 g of 35% aqueous hydrogen peroxide solution,
  8.5 g of 40% sodium bisulfite.

The iron sulfate, 20% of the DMDO and 90% of the 60% methallyl polyoxyalkylene glycol are introduced into the reactor containing 50 g of water. The reactor is heated to 55-60° C. The acrylic acid, a solution containing the remainder of the DMDO and of 60% methallyl polyoxyalkylene glycol, the aqueous hydrogen peroxide solution and a sodium bisulfite solution are injected in parallel into the reactor over 1 hour 40 minutes. The injection tubes are rinsed with 120 g of water and the reactor is maintained at a temperature of 58-62° C. for 1 hour 30 minutes.

The product is cooled and then neutralized by adding 109.4 g of 50% NaOH.

Copolymer B obtained has a molecular mass, measured as described previously, 172,500 g/mol.

Copolymer C (In Accordance with the Invention):
Copolymer C is obtained by polymerization using a mixture formed from:
  87.2 mol % of acrylic acid; and
  12.7 mol % of monomers (b) of formula (I') in which R$_1$ represents CH$_3$ and the polyalkoxyl chain, with a mean molar mass of 2700 g/mol, is formed to 88 mol % of ethoxyl units and to 12 mol % of propoxyl units, the ethoxyl and propoxyl units being distributed in blocks.
Protocol for Synthesizing Copolymer C:
Copolymer C is prepared according to a procedure similar to that described previously for copolymer B.

Copolymer C obtained has a molecular mass, measured as described previously, of 156,900 g/mol.

Copolymer D (Not in Accordance with the Invention)
Copolymer D is obtained by polymerization from a mixture of monomers formed of:
  85.9 mol. % of acrylic acid and
  14.1 mol. % of methallyl polyethylene glycol (Mw=2,400 g/mol).
Synthesis Protocol for Copolymer D:
The chemical products used are:
  0.11 g iron sulfate (FeSO$_4$•7H$_2$O),
  2.0 g of DMDO (1,8-dimercapto-3,6-dioxaoctane, CAS No.: 14970-87-7),
  297 g of methallyl polyethylene glycol at 60% (Mw=2,400 g/mol),
  32.5 g of acrylic acid,
  5.6 g of 35% hydrogen peroxide and
  5.6 g of 40% sodium bisulfite.

To the reactor containing 50 g of water, the iron sulfate, 20% of the DMDO and 90% of the 60% methallyl polyethylene glycol are introduced. The reactor is heated to 55-60° C. In parallel, in the reactor, acrylic acid, a solution containing the rest of the DMDO and the 60% methallyl polyethylene glycol, the hydrogen peroxide and a solution of sodium bisulfite are injected for 1 h 40 min. The injection hoses are rinsed with 120 g of water and the reactor is maintained at a temperature of 58-62° C. for 1 h 30 min.

The product is cooled then neutralized by adding 34.1 g of 50% NaOH.

The copolymer D obtained has a molecular mass, measured as described previously, of 128,200 g/mol.

Copolymer E (In Accordance with the Invention)
Copolymer E is obtained by polymerization from a mixture of monomers formed of:
  83.4 mol. % of acrylic acid and
  16.6 mol. % of monomers (b) of formula (I') in which R$_1$ represents CH$_3$ and having a polyalkoxylated chain of average molar mass of 1,990 g/mol, formed at 75 mol. % of ethoxylated units and 25 mol. % of propoxylated units, where the ethoxylated and propoxylated units are distributed in blocks.

Synthesis Protocol for Copolymer E:
The chemical products used are:
0.11 g of iron sulfate (FeSO$_4$•7H$_2$O),
2.3 g of DMDO,
297.3 g of monomers (b),
32.5 g of acrylic acid,
5.6 g of 35% hydrogen peroxide and
5.6 g of 40% sodium bisulfite.

To the reactor containing 50 g of water, the iron sulfate, 15% of the DMDO and 89% of the 60% methallyl polyoxyalkylene glycol are introduced. The reactor is heated to 55-60° C. In parallel, in the reactor, acrylic acid a solution containing the rest of the DMDO and the 60% methallyl polyoxyalkylene glycol, the hydrogen peroxide and a solution of sodium bisulfite are injected for 1 h 40 min. The injection hoses are rinsed with 120 g of water and the reactor is maintained at a temperature of 58-62° C. for 1 h 30 min.

The product is cooled then neutralized by adding 35.8 g of 50% NaOH.

The copolymer E obtained has a molecular mass, measured as described previously, of 86,100 g/mol.

Copolymer F (In Accordance with the Invention)
Copolymer F is obtained by polymerization from a mixture of monomers formed of:
87.2 mol. % of acrylic and
12.8 mol. % of monomers (b) of formula (I') in which $R_1$ represents $CH_3$ and having a polyalkoxylated chain with average molar mass of 2,700 g/mol, formed at 88 mol. % of ethoxylated units and 12 mol. % of propoxylated units, where the ethoxylated and propoxylated units are distributed into blocks.

Synthesis Protocol for Copolymer F:
Copolymer F is prepared according to a similar procedure to that described previously for copolymer E.

The copolymer F obtained has a molecular mass, measured as described previously, of 147,200 g/mol.

1.2.a Preparation of the Hydraulic Compositions 1-4:

In each of the tests, a concrete (350 kg/m$^3$) is prepared according to standard EN 480-1 by mixing, with stirring, standardized sand (0/4), cement (CEM I 52.5N Holcim), 4/11 and 11/22 gravels, water and an antifoam.

No admixture is added to composition 1 (reference).

The concrete formulations 2 to 4 are admixtured, respectively, with the solutions of copolymers A, B and C prepared as described previously.

The proportions of each of the constituents of the hydraulic compositions thus prepared are indicated in table 1 below.

1.2.b Preparation of the Hydraulic Compositions 5-8

In each of the tests, a concrete (660 kg/m$^3$) is prepared according to EN 480-1 standard by mixing with stirring standardized sand (0/4), cement (CEM I 52.5N Holcim), gravel 4/11, water and an anti-foaming agent.

No admixture is added to the composition 5 (control).

Concrete formulations 6 to 8 are supplemented respectively by the copolymer solutions D, E and F prepared as described previously.

For the preparation of concrete formulations 6 to 8 incorporating respectively copolymers D, E and F, the amount of water added is set so that the three hydraulic admixed compositions have the same water reduction (30%) as the control concrete.

The proportions of each of the constituents of the hydraulic compositions prepared in this way are indicated in Table 2 hereinbelow.

2. Evaluation of the Hydraulic Compositions 1-4:

The compositions are evaluated for their initial fluidity properties (workability at T0), air capture and water reduction properties according to the following protocols.

Measurement of the Workability at T0:

Measurement of the initial fluidity (or workability at T0) is performed at room temperature, using a bottomless cone, of frustoconical shape, made of galvanized steel, known as an Abrams cone, according to standard EN 12350-2. This cone has the following characteristics: upper diameter: 100±2 mm, lower diameter: 200±2 mm, height: 300±2 mm.

The cone is placed on a plate moistened with a sponge. The cone is then filled with a given amount of each of the preparations. The filling lasts for 2 minutes. The content of the cone is packed using a metal rod.

At the end of filling, the cone is raised vertically, which leads to the slump of its content onto the plate.

The concretes may be classified as a function of their workability according to standard EN 206-1.

Measurement of the Water Reduction:
This is measured according to standard ADMIXTURE NF EN 934-2.

The results obtained for the various hydraulic compositions are given in table 1 below.

TABLE 1

| Test | Composition 1 (negative reference) | Composition 2 (not in accordance) | Composition 3 (in accordance) | Composition 4 (in accordance) |
| --- | --- | --- | --- | --- |
| Sand (kg) | 34.4 | 34.4 | 34.4 | 34.4 |
| Gravel 4/11 (kg) | 15.2 | 15.2 | 15.2 | 15.2 |
| Gravel 11/22 (kg) | 24.2 | 24.2 | 24.2 | 24.2 |
| Cement (kg) | 14 | 14 | 14 | 14 |
| Admixture (g) | — | Copolymer A (80.9) | Copolymer B (87.9) | Copolymer C (81.1) |
| Solids content of the admixture | — | 39.8% | 36.6% | 39.7% |
| Dry % admixture/cement | — | 0.23 | 0.23 | 0.23 |
| Antifoam (%/admixture) | — | 0.5 | 0.5 | 0.5 |
| Water (g) | 9742 | 8320 | 6250 | 7032 |
| Water/cement weight ratio | 0.70 | 0.59 | 0.45 | 0.50 |
| Workability T0 | 220 | 220 | 200 | 210 |
| Water reduction | 0 | 15% | 36% | 28% |

For the preparation of the concrete formulations 2 to 4 incorporating, respectively, copolymers A, B and C, the water/cement weight ratio is adjusted so as to conserve an initial workability similar to that of the reference concrete.

The hydraulic compositions all have a homogeneous appearance, without segregation of the constituents.

The implementation of copolymers B and C according to the invention makes it possible to reduce the amount of water by 36% and 28%, respectively, in the hydraulic composition, while at the same time maintaining initial fluidity (workability) similar to that of the negative reference.

The copolymers according to the invention may be characterized as "high-efficiency water-reducing agents" in accordance with standard ADMIXTURE NF EN 934-2 according to which the term "high-efficiency water-reducing agent" or "superplasticizer" defines an admixture which allows a water reduction for admixtured concrete of at least 12% relative to reference concrete.

It is thus demonstrated that the copolymers according to the invention (copolymers B and C) make it possible to significantly reduce the amount of water in the hydraulic composition (36% and 28%, respectively) when compared with the implementation of copolymer A not in accordance with the invention (15%), without affecting the workability of said hydraulic composition.

3. Evaluation of the Hydraulic Compositions 5-6

The compositions are evaluated for their properties of initial fluidity (workability at T0), air capture, water reduction and compressive strength at 1 day, according to the following protocols.

Measurement of the Workability at T0

The measurement of the initial fluidity (or workability at T0) is carried out, at ambient temperature, using a bottomless truncated cone made of galvanized steel called an Abrams cone, according to EN 12350-2 standard. This cone has the following characteristics:

Upper diameter: 100±2 mm,
Lower diameter: 200±2 mm and
Height: 300±2 mm.

The cone is placed on a moistened plate using a sponge. The cone is filled with a determined amount of each of the preparations. The filling lasts 2 minutes. The contents of the cone is tapped using a metal rod.

As soon as filling is over, the cone is raised vertically, which leads to its contents slumping onto the plate.

The diameter of the resulting cake is measured after 30 seconds.

Concretes may be classified as a function of their workability according to EN 206-1 standard. In particular, it can be considered that concretes having a difference less than or equal to 60 mm with spreading have equivalent consistencies.

Measurement of Air Capture

Air capture is measured according to EN 12350-7 standard, paragraph 3.3.

Water Reduction Measurement

This is measured according to the ADMIXTURE NF EN 934-2 standard.

Measurement of Compressive Strength

The compressive strength measurements at 1 day are carried out according to EN 12390-3 standard, paragraph 3. The compressive strength is expressed in MPa. The tests were carried out on a Class 1 test machine according to the EN 12390-4 standard.

The results obtained for the different hydraulic compositions are indicated in Table 2 below.

TABLE 2

| Test | Composition 5 (Negative control) | Composition 6 (Non-compliant) | Composition 7 (Compliant) | Composition 8 (Compliant) |
| --- | --- | --- | --- | --- |
| Sand (kg) | 24.4 | 24.4 | 24.4 | 24.4 |
| Gravel 4/11 (kg) | 35.6 | 35.6 | 35.6 | 35.6 |
| Cement (kg) | 25 | 25 | 25 | 25 |
| Water (g) | 12,411 | 8,687 | 8,687 | 8,687 |
| Water/cement ratio by weight | 0.50 | 0.34 | 0.34 | 0.34 |
| Water reduction | 0% | 30% | 30% | 30% |
| Admixture (g) | — | Copolymer D (189) | Copolymer E (187) | Copolymer F (189) |
| Dry solids content of the admixture | — | 39.7% | 40.1% | 39.7% |
| % dry admixture/cement admixture | — | 0.3 | 0.3 | 0.3 |
| Anti-foaming agent (%/admixture) | — | 0.5 | 0.5 | 0.5 |
| Workability T0 (mm) | 580 | 580 | 520 | 560 |
| Air capture at T0 | 1.0% | 3.2% | 2.9% | 2.9% |
| Sample weight | 4.82 | 4.92 | 4.92 | 4.96 |
| Compressive strength at 1 day (MPa) | 16.0 | 24.4 | 25.5 | 30.3 |
| % of the control strength value | 100% | ~153% | ~159% | ~189% |

All of the hydraulic compositions present an homogeneous appearance, without segregation of constituents.

Using copolymers E and F according to the invention produces high compressive resistances at 1 day, while maintaining a satisfactory initial consistency (workability T0).

It is demonstrated in particular that copolymers E and F according to the invention produce, for the same water reduction for the hydraulic composition, improved resistances at 1 day (respectively of about 5% and 24%), in comparison with use of copolymer D not in accordance with the invention, while conserving good workability of the hydraulic composition.

The invention claimed is:
1. A copolymer obtained by polymerization of a monomer mixture comprising:
at least one anionic monomer (a) comprising a polymerizable unsaturated function and a carboxylic group; and
at least one monomer (b) of formula (I):

$$H_2C=C(-R_1)-(CH_2)_p-O-[(EO)_n-(PO)_m]-H \qquad (I)$$

wherein:
$R_1$ represents a hydrogen atom or a $CH_3$ group;
p is 1 or 2;
$[(EO)_n-(PO)_m]$ represents a polyalkoxyl chain made of ethoxyl units EO and propoxyl units PO, distributed in blocks, alternately or randomly;
m and n represent integers ranging between 1 and 250, the sum of m and n being greater than or equal to 10, with the proviso that the mole proportion of the ethoxyl units in the polyalkoxyl chain (n)/(m+n) is greater than or equal to 70% and less than 90%, wherein the monomer (b) represents from 1 to 18 mol % of the total mole number of monomers that constitute said copolymer.

2. The copolymer of claim 1, wherein the monomer (b) has formula (I'):

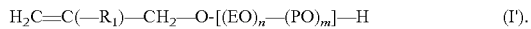
$$H_2C=C(-R_1)-CH_2-O-[(EO)_n-(PO)_m]-H \qquad (I').$$

3. The copolymer of claim 1, wherein monomer (b) has formula (II):

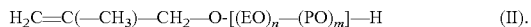
$$H_2C=C(-CH_3)-CH_2-O-[(EO)_n-(PO)_m]-H \qquad (II).$$

4. The copolymer of claim 1, wherein the mole proportion of the ethoxyl units in the polyalkoxyl chain of monomer (b) is between 70% and 88%.

5. The copolymer of claim 1, wherein the total number of ethoxyl and propoxyl units (m+n) of the polyalkoxyl chain of the monomer (b) is between 10 and 150.

6. The copolymer of claim 1, wherein the monomer (b) represents from 1 to 16.6 mol % of the total mole number of monomers that constitute said copolymer.

7. The copolymer of claim 1, wherein the anionic monomer is at least one selected from the group consisting of acrylic acid, methacrylic acid, maleic acid, itaconic acid, and crotonic acid.

8. The copolymer of claim 1, wherein the monomer (a) represents from 82 to 99 mol % of the total mole number of monomers that constitute said copolymer.

9. The copolymer of claim 1, wherein the monomer mixture further comprises at least one further monomer (c) selected from the group consisting of:
  2-acrylamino-2-methylpropane sulfonic acid (AMPS);
  a vinylsulfonate;
  an amine;
  an ester containing a hydroxyl group;
  an alkylene glycol acrylate or methacrylate phosphate;
  an acrylamide or methacrylamide;
  a phosphonic monomer;
  a macromonomer of formula (VI):

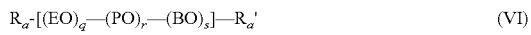
$$R_a\text{-}[(EO)_q-(PO)_r-(BO)_s]-R_a' \qquad (VI)$$

wherein:
  $[(EO)_q-(PO)_r-(BO)_s]$ represents a polyalkoxyl chain made of alkoxyl units, distributed in blocks, alternately or randomly, chosen from ethoxyl units EO, propoxyl units PO, and butoxyl units BO;
  q, r and s represent, independently of each other, 0 or an integer ranging between 1 and 250, the sum of m, n and p being between 10 and 250;
  $R_a$ represents a radical chosen from the group consisting of acrylic esters, methacrylic esters and a mixture of these esters; and
  $R_a'$ represents hydrogen or an alkyl group containing from 1 to 4 carbon atoms:
  a hydrophobic monomers of formula (VII):

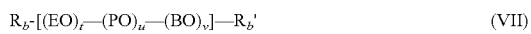
$$R_b\text{-}[(EO)_t-(PO)_u-(BO)_v]-R_b' \qquad (VII)$$

wherein:
  $[(EO)_t-(PO)_u-(BO)_v]$ represents a polyalkoxyl chain made of alkoxyl units, distributed in blocks, alternately or randomly, chosen from ethoxyl units EO, propoxyl units PO, and butoxyl units BO;
  t, u and v represent, independently of each other, 0 or an integer ranging between 1 and 250, the sum of m, n and p being between 10 and 250;
  $R_b$ represents a radical chosen from the group consisting of acrylic esters, methacrylic esters and a mixture of these esters; and
  $R_b'$ represents an alkyl group containing from 8 to 40 carbon atoms; and
  a crosslinking monomer.

10. A hydraulic composition comprising a copolymer of claim 1.

11. A water reducing agent comprising a copolymer of claim 1.

12. A method for reducing water in a hydraulic composition, the method comprising:
  incorporating a copolymer according to claim 1 into a hydraulic composition comprising water, thereby reducing the water content of the hydraulic composition by at least 5% by weight.

13. The method of claim 12, wherein the water content is reduced by at least 12% by weight.

14. A method for increasing early mechanical strength of a hydraulic composition, the method comprising:
  incorporating, into a hydraulic composition, at least one copolymer obtained by polymerization of a monomer mixture comprising:
    at least one anionic monomer (a) comprising a polymerisable unsaturated group and a carboxylic group; and
    at least one monomer (b) of formula (I):

$$H_2C=C(-R_1)-(CH_2)_p-O-[(EO)_n-(PO)_m]-H \qquad (IA)$$

wherein:
    $R_1$ represents a hydrogen atom or a $CH_3$ group,
    p is equal to 1 or 2,
    $[(EO)_n-(PO)_m]$ represents a polyalkoxylated chain constituted of ethoxylated units EO and propoxylated units PO, distributed in blocks, alternating or random and
    m and n represent integers varying between 1 and 250, the sum of m and n being greater than or equal to 10, provided that the molar proportion of the ethoxylated units in the polyalkoxylated chain (n)/(m+n) is greater than or equal to 70% and less than 90%,
  wherein the monomer (b) represents from 1 to 18 mol % of the total mole number of monomers that constitute said copolymer.

15. The method of claim 14, wherein a compressive strength of the hydraulic composition at 1 day, measured according to EN 12390-3 standard, is greater than or equal to 155% of the value of the compressive strength of the hydraulic composition devoid of the copolymer.

16. The method of claim 14, wherein the monomer (b) has formula (IA'):

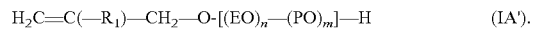
$$H_2C=C(-R_1)-CH_2-O-[(EO)_n-(PO)_m]-H \qquad (IA').$$

17. The method of claim 14, wherein the monomer (b) has formula (II):

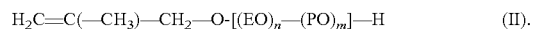
$$H_2C=C(-CH_3)-CH_2-O-[(EO)_n-(PO)_m]-H \qquad (II).$$

18. The method of claim 14, wherein the total number of ethoxylated and propoxylated units (m+n) of the polyalkoxylated chain of the monomer (b) is between 10 and 150.

19. The method of claim 14, wherein the monomer (b) represents from 1 mol % to 16.6 mol % of the total mole number of monomers that constitute the copolymer.

20. The method of claim 14, wherein the anionic monomer (a) is at least one selected from the group consisting of acrylic acid, methacrylic acid, maleic acid, itaconic acid, and crotonic acid.

* * * * *